(12) United States Patent
Nakaya

(10) Patent No.: US 10,586,116 B2
(45) Date of Patent: Mar. 10, 2020

(54) VEHICLE EVALUATION DEVICE

(71) Applicant: Panasonic Intellectual Property Management Co., Ltd., Osaka (JP)

(72) Inventor: Satoshi Nakaya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 416 days.

(21) Appl. No.: 15/124,693

(22) PCT Filed: Mar. 30, 2015

(86) PCT No.: PCT/JP2015/001824
§ 371 (c)(1),
(2) Date: Sep. 9, 2016

(87) PCT Pub. No.: WO2015/155957
PCT Pub. Date: Oct. 15, 2015

(65) Prior Publication Data
US 2017/0017847 A1    Jan. 19, 2017

(30) Foreign Application Priority Data
Apr. 9, 2014   (JP) .................................. 2014-079858

(51) Int. Cl.
*G06K 9/00*   (2006.01)
*B60R 1/00*   (2006.01)
(Continued)

(52) U.S. Cl.
CPC ............ *G06K 9/00791* (2013.01); *B60R 1/00* (2013.01); *G01B 11/14* (2013.01); *G01M 17/007* (2013.01);
(Continued)

(58) Field of Classification Search
CPC ................ G06K 9/00791; G06T 7/70; G06T 2207/30252; H04N 9/3147; H04N 9/3179;
(Continued)

(56) References Cited

U.S. PATENT DOCUMENTS 6,023,984 A  *  2/2000  Mazur ............... G01M 17/0078
                                                                73/865.3
7,461,939 B2 * 12/2008  Allen .................... H04N 9/3141
                                                                345/660
(Continued)

FOREIGN PATENT DOCUMENTS

JP         61-255380         11/1986
JP         2001-092343        4/2001
(Continued)

OTHER PUBLICATIONS

The Extended European Search Report dated Apr. 10, 2017 for the related European Patent Application No. 15777502.4.
(Continued)

*Primary Examiner* — Susan E. Hodges
(74) *Attorney, Agent, or Firm* — Pearne & Gordon LLP

(57) ABSTRACT

A vehicle evaluation device includes a first projection target, a first projector, and a controller. The first projection target enables projection of an image thereon, and is capable of changing positions. The first projector projects an image onto the first projection target. The controller controls the position of the first projection target, and performs control for changing an image to be projected by the first projector according to the position of the first projection target.

13 Claims, 11 Drawing Sheets

(51) Int. Cl.
  *G01B 11/14* (2006.01)
  *G06T 7/00* (2017.01)
  *G09B 9/05* (2006.01)
  *H04N 9/31* (2006.01)
  *G01M 17/007* (2006.01)
  *G06T 7/70* (2017.01)

(52) U.S. Cl.
  CPC ............... *G06T 7/70* (2017.01); *G09B 9/05* (2013.01); *H04N 9/3141* (2013.01); *H04N 9/3147* (2013.01); *H04N 9/3179* (2013.01); *B60R 2300/8093* (2013.01); *G06T 2207/30252* (2013.01)

(58) Field of Classification Search
  CPC ........ H04N 9/3141; G01B 11/14; G09B 9/05; G01M 17/007; B60R 2300/8093; B60R 1/00
  USPC .......................................................... 348/148
  See application file for complete search history.

(56) References Cited

U.S. PATENT DOCUMENTS

| | | | |
|---|---|---|---|
| 2006/0042365 A1* | 3/2006 | Bond | ................ G01M 17/0076 73/116.06 |
| 2006/0057544 A1 | 3/2006 | Bond | |
| 2006/0078854 A1 | 4/2006 | Bond | |
| 2009/0268095 A1 | 10/2009 | Hoshino et al. | |
| 2014/0092249 A1* | 4/2014 | Freiburger | ............. H04N 7/181 348/148 |

FOREIGN PATENT DOCUMENTS

| | | |
|---|---|---|
| JP | 2006-215365 | 8/2006 |
| JP | 2007-156020 | 6/2007 |
| JP | 2007-522500 | 8/2007 |
| JP | 2008-033234 | 2/2008 |
| JP | 2008-107537 | 5/2008 |
| JP | 2008-224885 | 9/2008 |
| WO | 2013/162515 A1 | 10/2013 |
| WO | 2014/050415 | 4/2014 |

OTHER PUBLICATIONS

International Search Report of PCT application No. PCT/JP2015/001824 dated Jun. 23, 2015.
English Translation of Chinese Office Action dated Apr. 2, 2018 for the related Chinese Patent Application No. 201580016985.X.

\* cited by examiner

Arrow H

Arrow H

VEHICLE EVALUATION DEVICE

TECHNICAL FIELD

The present invention relates to a vehicle evaluation device that evaluates various functions of a vehicle.

BACKGROUND ART

Conventionally, there is a vehicle evaluation device that projects an image obtained by simulating a running state of a vehicle onto a screen installed around the vehicle from a projector (for example, PTLs 1 and 2).

CITATION LIST

Patent Literature

PTL 1: Unexamined Japanese Patent Publication No. 2001-92343

PTL 2: Unexamined Japanese Patent Publication No. S61-255380

SUMMARY OF THE INVENTION

The present invention provides a vehicle evaluation device that can simultaneously evaluate a function based on a camera mounted to a vehicle and a function based on a distance measurement sensor mounted to the vehicle.

The vehicle evaluation device according to the present invention includes a first projection target, a first projector, and a controller. The first projection target enables projection of an image thereon, and is capable of changing positions. The first projector projects an image onto the first projection target. The controller controls the position of the first projection target, and performs control for changing an image projected by the first projector according to the position of the first projection target.

As described above, the controller performs control for changing the image according to the position of the first projection target. Accordingly, the functions based on the camera and the distance measurement sensor, which are mounted to the vehicle, can simultaneously be evaluated.

DESCRIPTION OF EMBODIMENTS

Figure 1:
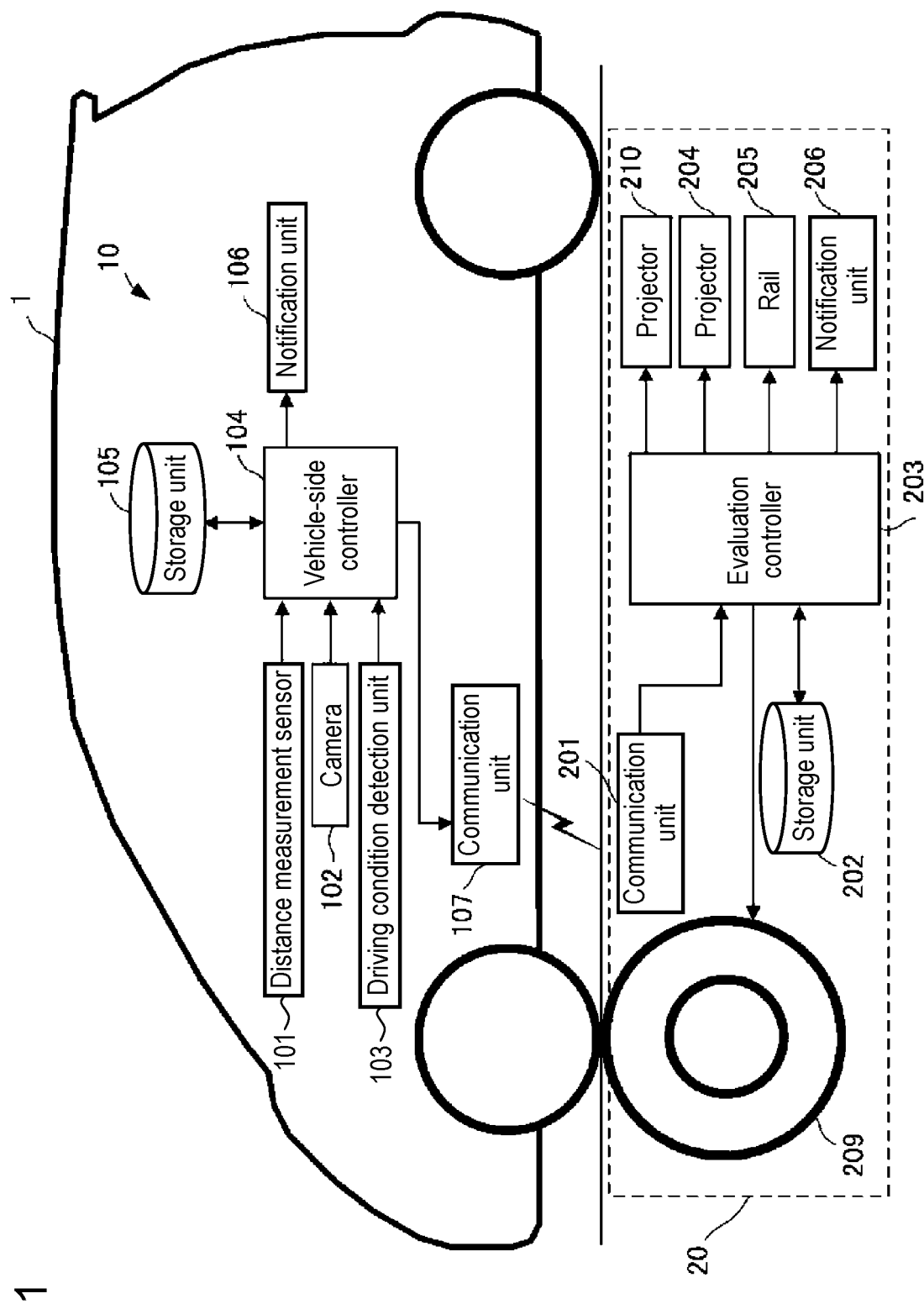
FIG. 1 is a block diagram illustrating a vehicle evaluation device and a peripheral configuration according to a first exemplary embodiment of the present invention.

Prior to the description of exemplary embodiments of the present invention, problems of a conventional vehicle evaluation device will be briefly described. Recently, an apparatus which includes a camera provided in a vehicle and a display installed in a compartment of the vehicle, and enables a driver to confirm a condition around the vehicle by the display has been put into practical use. Further, an on-vehicle device that analyzes an image captured by a camera and issues to a driver a warning indicating that other vehicles or the like approach the vehicle has been put into practical use.

In addition, an on-vehicle device including a distance measurement sensor using ultrasonic wave or laser for precisely measuring a distance to an object around the vehicle has been put into practical use. By using the distance measurement sensor, a distance to an object around the vehicle from the vehicle can more precisely be measured than with an image analysis by a camera. Therefore, more precise warning or the like can be issued.

To evaluate various functions of the on-vehicle device, such as a warning, it is required to perform a running test on a real road. However, since evaluation of various conditions on a real road is difficult, it is effective to use a vehicle evaluation device that can evaluate various functions of an on-vehicle device while keeping the vehicle still (or moving the vehicle at low speed).

However, the above conventional technique has the problem described below. According to the techniques disclosed in PTL 1 and PTL 2, a predetermined image is projected on a screen. Since a predetermined image can be projected, it is possible to evaluate various functions of an on-vehicle device on the basis of an image captured by a camera as described above.

However, according to the techniques disclosed in PTL 1 and PTL 2, a predetermined image is projected on a stationary screen. The distance measurement sensor measures a distance using ultrasonic wave, laser, or the like. Therefore, if the screen is still, it is determined that there is no change in distance no matter how much the projected image changes. Accordingly, various functions based on the measurement result of the distance measurement sensor cannot be evaluated.

As described above, according to the techniques disclosed in PTL 1 and PTL 2, functions based on a distance measurement sensor cannot be evaluated, although functions based on an image captured by a camera can be evaluated.

Exemplary embodiments of the present invention will be described below in detail with reference to the drawings. Note that the same components are identified by the same reference numerals in all drawings for describing each of the exemplary embodiments, and the repeated description will be omitted below.

First Exemplary Embodiment

Figure 2:
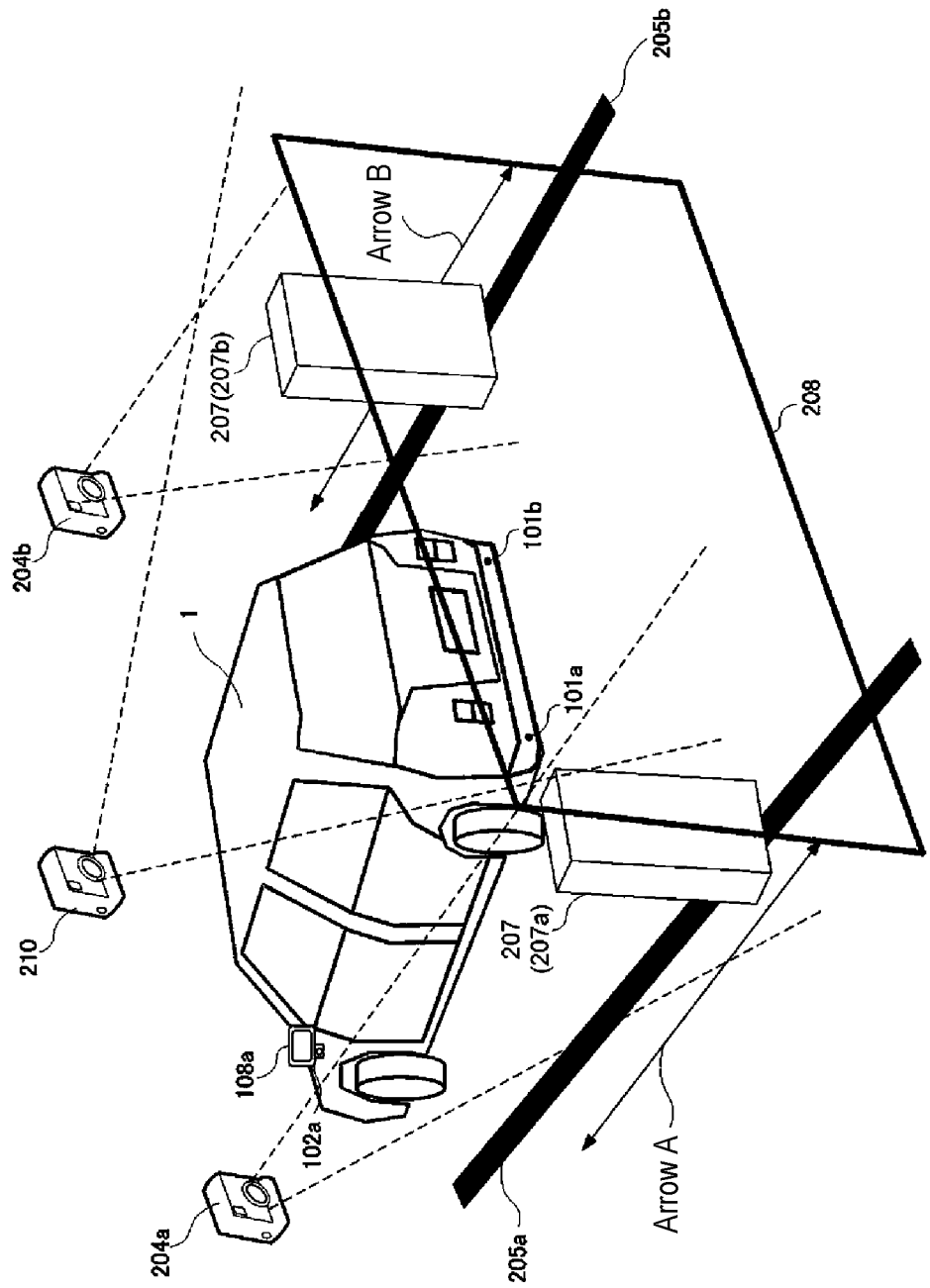
FIG. 2 is a diagram illustrating the vehicle evaluation device and the peripheral configuration according to the first exemplary embodiment of the present invention.
Figure 3:
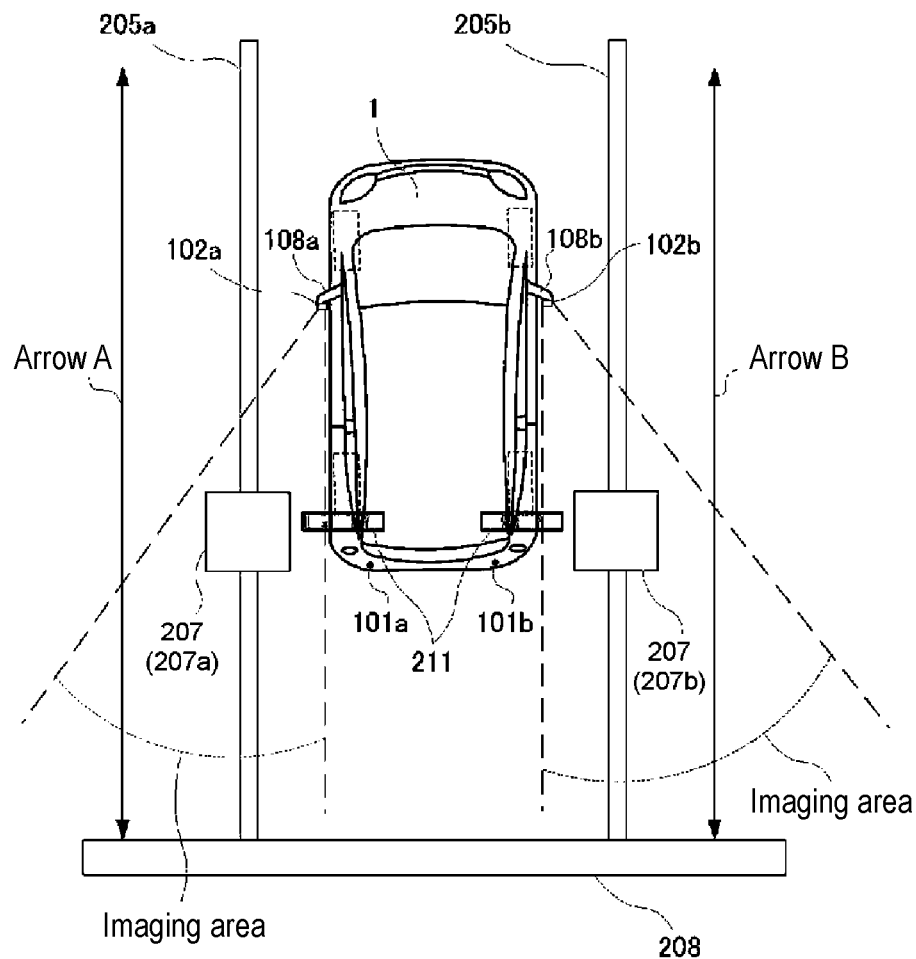
FIG. 3 is a diagram illustrating the vehicle evaluation device and the peripheral configuration according to the first exemplary embodiment of the present invention.
Figure 4:
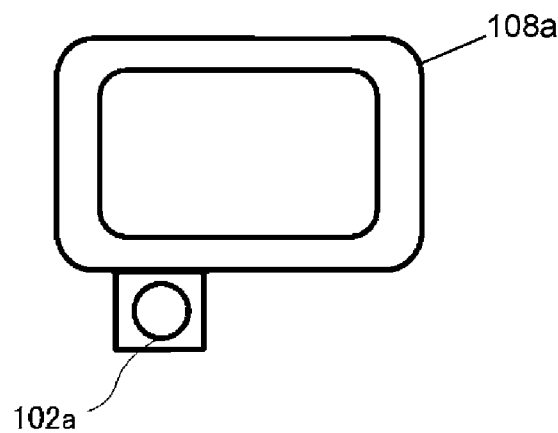
FIG. 4 is diagram for describing an arrangement of a camera according to the first exemplary embodiment of the present invention.

An exemplary embodiment of the present invention will be described below in detail with reference to FIGS. 1 to 7. Firstly, a vehicle evaluation device and peripheral configuration according to the exemplary embodiment of the present invention will be described with reference to FIGS. 1 to 4. FIGS. 1 to 3 are diagrams illustrating the vehicle evaluation device and the peripheral configuration according to the first exemplary embodiment of the present invention. Further, FIG. 4 is a diagram for describing an arrangement of a camera according to the first exemplary embodiment of the present invention.

On-vehicle device 10 is provided to vehicle 1, and includes distance measurement sensor 101, camera 102, driving condition detection unit 103, vehicle-side controller 104, storage unit 105, notification unit 106, and communication unit 107.

Further, vehicle evaluation device 20 includes communication unit 201, storage unit 202, evaluation controller 203, projector 204, rail 205, notification unit 206, projection target 207 (207a, 207b), screen 208, wheel receiving base 209, second projector 210, and wheel stopper 211. Projector 204, second projector 210, rail 205, projection target 207, and screen 208 are a first projector, a second projector, an operating unit, a first projection target, and a second projection target, respectively.

Vehicle evaluation device 20 evaluates functions based on camera 102 mounted to vehicle 1 for capturing an image around vehicle 1, and functions based on distance measurement sensor 101 that measures a distance from vehicle 1 to an object around vehicle 1, with vehicle 1 being placed at a predetermined position.

Specifically, vehicle evaluation device 20 includes projection target 207 that enables projection of an image thereon and is capable of changing positions, and projector 204 that projects an image to projection target 207, and evaluation controller 203 controls the position of projection target 207 and performs control for changing an image projected by projector 204 according to the position of projection target 207. Each unit will be described below in detail.

[Configuration of On-Vehicle Device]

Distance measurement sensor 101 measures a distance from vehicle 1 to an object around vehicle 1. Distance measurement sensor 101 (101a, 101b) is provided to a bumper at the rear of vehicle 1, for example, as illustrated in FIG. 2. Distance measurement sensor 101 is a radar using laser, sound wave, or the like. The measurement result of distance measurement sensor 101 is transmitted to vehicle-side controller 104.

Camera 102 captures an image around vehicle 1. Camera 102 (102a) is provided below mirror 108a, for example, to capture an image at the back of vehicle 1 as illustrated in FIG. 4. The captured image is transmitted to vehicle-side controller 104. Camera 102b is also similarly mounted below mirror 108b. Camera 102 captures, for example, an image in an imaging area indicated by a broken line in FIG. 3, and transmits the resultant image to vehicle-side controller 104.

Driving condition detection unit 103 detects various driving conditions. The driving condition means a shift position, a steering angle of a steering wheel, the speed of vehicle 1, and the like. The detected driving condition is transmitted to vehicle-side controller 104.

Vehicle-side controller 104 implements various functions based on camera 102 and the result of distance measurement sensor 101. For example, when determining that an object such as another vehicle approaches from the back of vehicle 1 as a result of the analysis of the image captured by camera 102, notification unit 206 controlled by vehicle-side controller 104 issues predetermined notification. In this case, the image captured by camera 102 may be displayed on notification unit 206.

Further, when determining that an object such as another vehicle approaches from the back of vehicle 1 as a result of the analysis of the measurement result of distance measurement sensor 101, notification unit 206 controlled by vehicle-side controller 104 issues predetermined notification.

Besides, the various functions based on camera 102 and the result of distance measurement sensor 101 may include functions for automatically moving a vehicle other than a driving control by a driver, such as lane keep for automatically keeping a lane while driving a vehicle, automatic parking, automatic cruise control, automatic lane change, automatic obstacle avoidance, and automatic driving for automatically driving a vehicle to a destination.

Storage unit 105 is a storage medium in which vehicle-side controller 104 can write or read various information. Storage unit 105 is a hard disk, for example. Various pieces of information include an image captured by camera 102, the measurement result of distance measurement sensor 101, and the like.

Notification unit 106 controlled by vehicle-side controller 104 notifies various pieces of information. Various pieces of information include an image captured by camera 102, a warning with approach of an object to vehicle 1, and the like. Notification unit 106 includes a speaker issuing notification with sound, a display issuing notification with light, or the like.

Communication unit 107 performs bidirectional data communication with communication unit 201 in a wireless manner or the like. Data that is to be received and transmitted will be described later. Communication unit 107 is controlled by vehicle-side controller 104.

[Configuration of Vehicle Evaluation Device]

Next, each component of vehicle evaluation device 20 will be described in detail.

Communication unit 201 performs bidirectional data communication with communication unit 107 in a wireless manner or the like. Communication unit 201 is controlled by evaluation controller 203.

Storage unit 202 is a storage medium in which evaluation controller 203 can write or read various information. Storage unit 202 is a hard disk, for example. Various pieces of information include an evaluation scenario for evaluating functions based on camera 102 and distance measurement sensor 101, for example. The evaluation scenario is, for example, the position of projection target 207 and the data of an image to be projected to projection target 207 by projector 204, the data being stored in time series.

Projector 204 (204a, 204b) is a projector that can vary an area of an image to be projected. Projector 204 controlled by evaluation controller 203 projects various images to projection target 207. As projector 204, a projector that varies an area of an image to be projected with a focus point being variable can be used, and a projector that varies an area of an image to be projected with a scan of laser can be used.

Rail 205 (205a, 205b) generates power for generating operating power to move projection target 207 in a predetermined direction. Rail 205 includes an electric motor and a drive belt, for example. Rail 205 is controlled by evaluation controller 203.

Notification unit 206 controlled by evaluation controller 203 notifies various pieces of information. Various pieces of information include the progress of evaluation, for example. Notification unit 206 includes a speaker issuing notification with sound, a display issuing notification with light, or the like.

Projection target 207 is an object that enables projection of an image thereon, and is capable of changing positions. Projection target 207 changes its position by operating power generated by rail 205. In addition, various images are projected on projection target 207 by projector 204. Projection target 207 serves as an approaching object to vehicle 1 when various functions based on camera 102 and the result of distance measurement sensor 101 are evaluated.

Projection target 207 (207a, 207b) can change its position in the direction parallel to the direction in which vehicle 1 moves forward or the direction in which vehicle 1 moves backward as indicated by arrow A or arrow B in FIG. 2, for example.

Screen 208 is a projection target that enables projection of an image thereon, and has fixed position. Second projector 210 projects an image onto screen 208. Second projector 210 is controlled by evaluation controller 203.

Since the position of screen 208 is fixed, second projector 210 may fix an area of an image to be projected, different from projector 204. As illustrated in FIG. 2, screen 208 is installed at the back of vehicle 1, and a background image in evaluating various functions is projected thereon.

Wheel receiving base 209 is a base on which the wheel of vehicle 1 installed at a predetermined position is placed and that is rotatable according to the rotation of the wheel. Since wheel receiving base 209 is used, the position of vehicle 1 is not changed even if the wheel of vehicle 1 rotates. Thus, various functions depending on the speed of vehicle 1 can be evaluated without changing the position of vehicle 1. Wheel receiving base 209 controlled by evaluation controller 203 changes a load applied to the wheel of vehicle 1.

Wheel stoppers 211 are members for placing vehicle 1 at a predetermined position. Specifically, wheel stoppers 211 restrict the position of rear wheels of vehicle 1, thereby allowing vehicle 1 to place at the predetermined position, as illustrated in FIG. 3.

Evaluation controller 203 controls the position of projection target 207, and an image projected by projector 204 controlled by evaluation controller 203 changes according to the position of projection target 207, thereby simulating a surrounding environment of vehicle 1.

Next, the simulation of the surrounding environment of vehicle 1 will be described with reference to FIGS. 5A to 6B. FIGS. 5A to 6B are diagrams for describing an image captured by the camera according to the first exemplary embodiment of the present invention.

Projection target 207b is variable in positions in the direction parallel to the direction in which vehicle 1 moves forward or backward when vehicle 1 is placed at a predetermined position. Projection target 207b is moved by operating power generated by rail 205b.

Figure 5A:
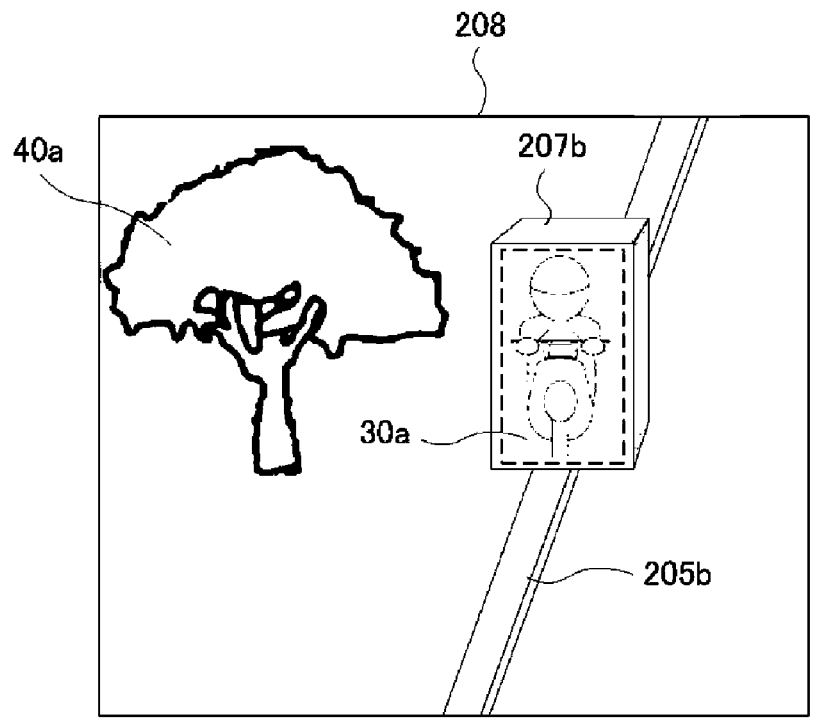
FIG. 5A is a diagram for describing an image captured by the camera according to the first exemplary embodiment of the present invention.
Figure 5B:
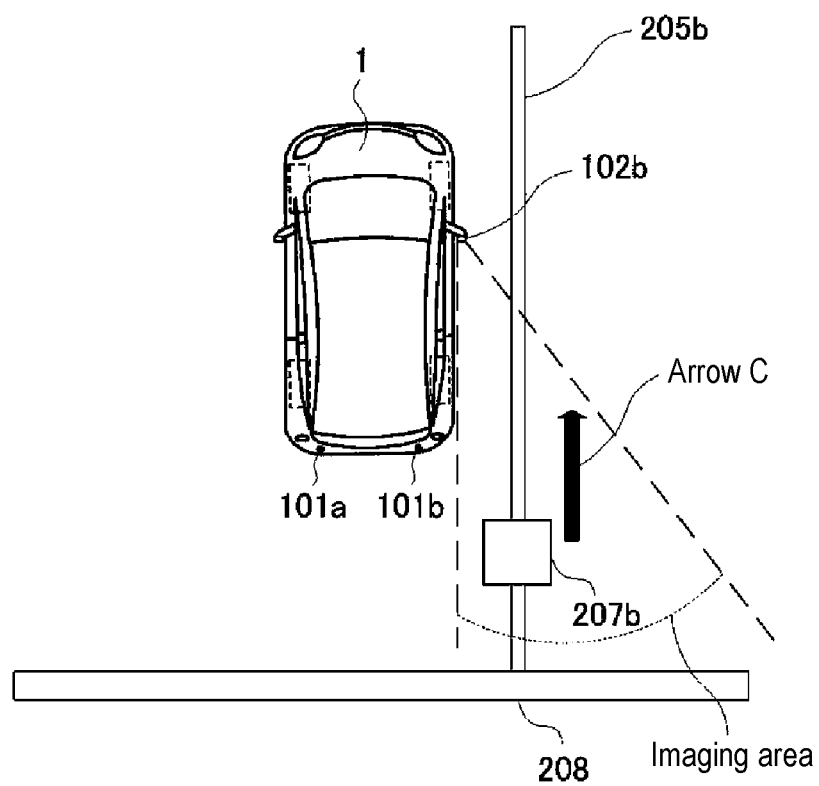
FIG. 5B is a diagram for describing an image captured by the camera according to the first exemplary embodiment of the present invention.

Camera 102b captures an image in the imaging area in FIG. 5B. In the case where projection target 207b is located at the position illustrated in FIG. 5B, camera 102b captures an image illustrated in FIG. 5A. Image 30a of a person on a motorbike is projected on projection target 207b by projector 204b.

In this case, projector 204b projects the image to be projected on projection target 207b so as not to be beyond the area of projection target 207b. According to this, the precision of simulation of the surrounding environment is enhanced.

Further, second projector 210 projects an image of a tree on screen 208 as background image 40a.

Figure 6A:
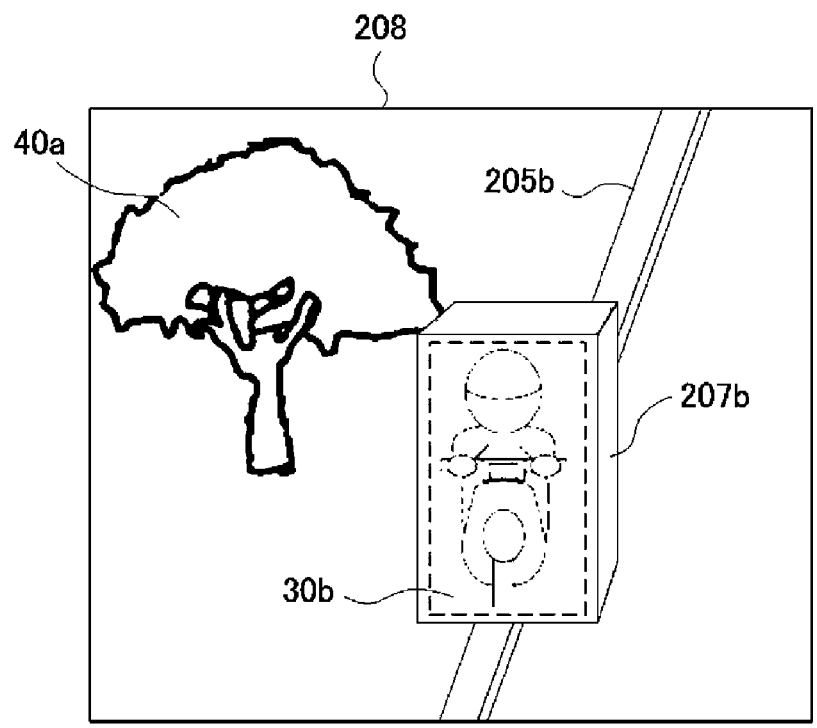
FIG. 6A is a diagram for describing an image captured by the camera according to the first exemplary embodiment of the present invention.
Figure 6B:
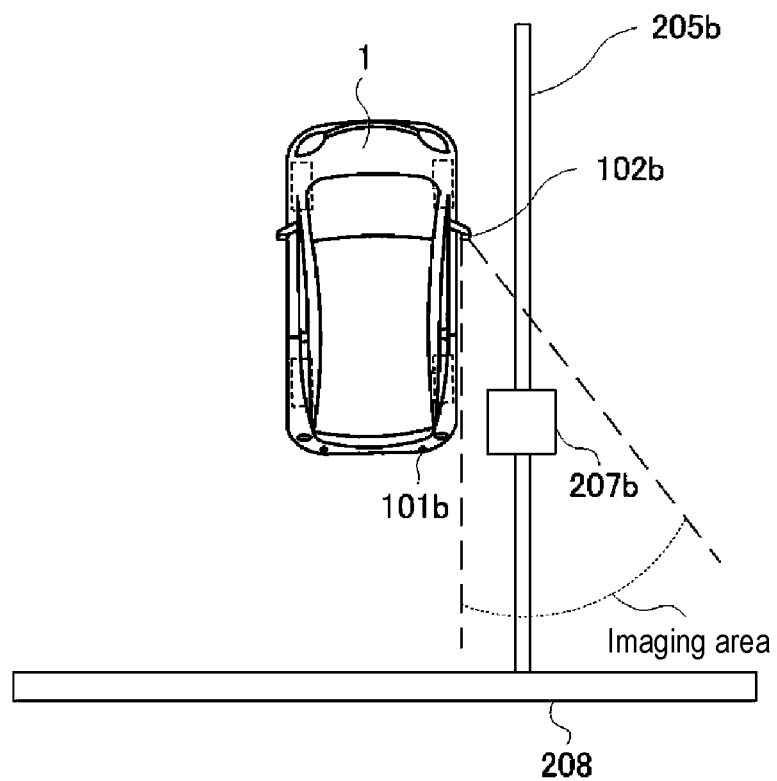
FIG. 6B is a diagram for describing an image captured by the camera according to the first exemplary embodiment of the present invention.

FIG. 6B illustrates the state in which projection target 207b is moved in the direction of arrow C illustrated in FIG. 5B from the state in FIG. 5B. When projection target 207b is located at the position illustrated in FIG. 6B, camera 102b captures the image illustrated in FIG. 6A. Since projection target 207b approaches vehicle 1, image 30b on projection target 207b in FIG. 6A is captured larger than that in FIG. 5A.

In changing the state to the state in FIG. 5B, evaluation controller 203 performs control for changing the image to be projected by projector 204 according to the position of projection target 207. Specifically, evaluation controller 203 performs control to increase an area of the image to be projected with the approach of projection target 207b to projector 204b. In this case, projector 204b projects the image to be projected on projection target 207b so as not to be beyond the area of projection target 207b, as in FIG. 5B. Note that, in FIG. 6B, second projector 210 projects background image 40a, which is the same as in FIG. 5A, on screen 208.

As described above, the evaluation of the function based on distance measurement sensor 101 mounted to vehicle 1, which captures an image around vehicle 1, is enabled by changing the position of projection target 207. The evaluation of the function based on camera 102 mounted to vehicle 1 is enabled by simultaneously performing control for changing the image to be projected according to the position of projection target 207.

Notably, FIGS. 5A to 6B only describe the simulation at the right surrounding environment of vehicle 1. However, the left surrounding environment can similarly be simulated.

[Operations of On-Vehicle Device and Vehicle Evaluation Device]

Figure 7:
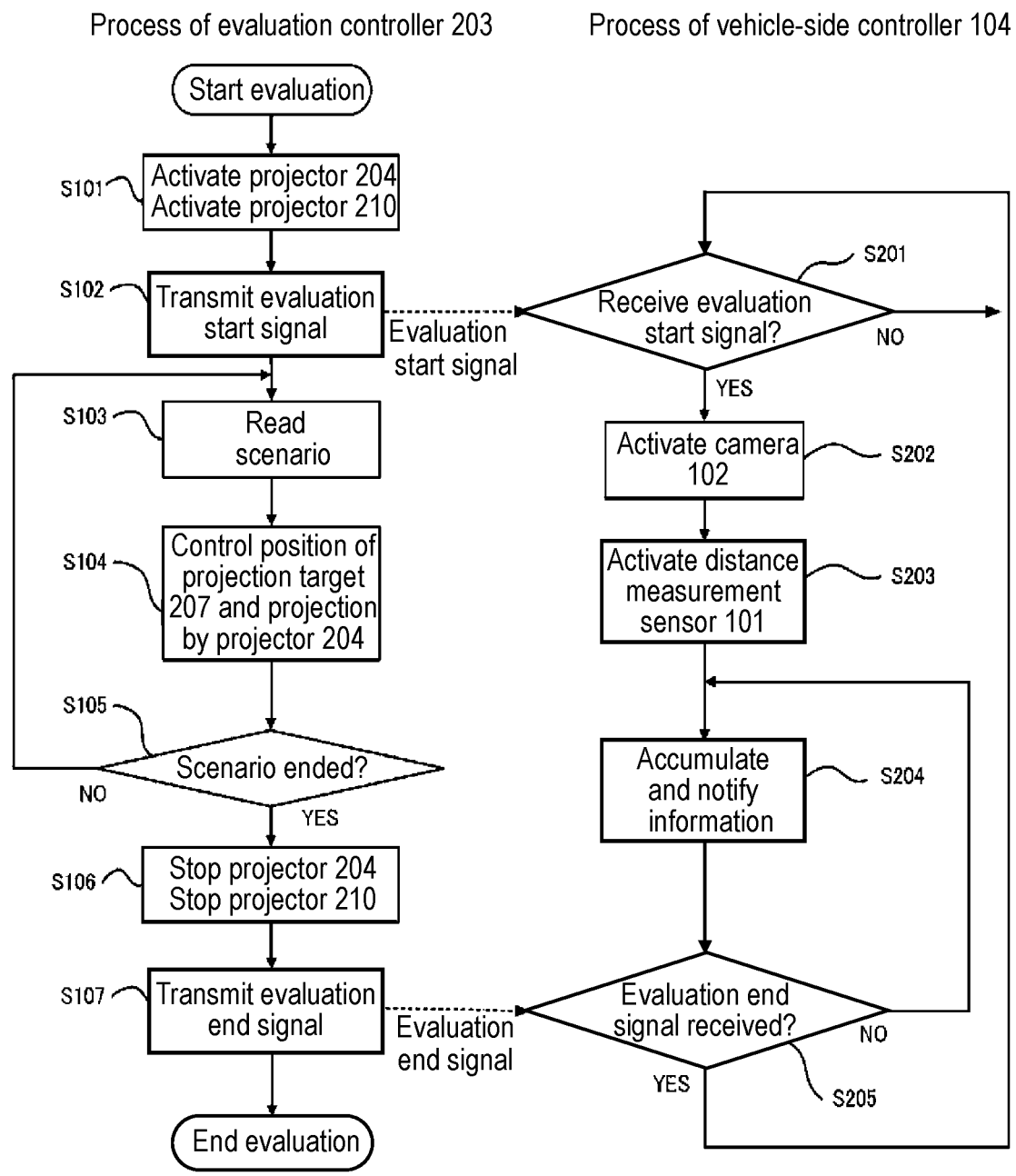
FIG. 7 is a flowchart illustrating operation examples of an on-vehicle device and the vehicle evaluation device according to the first exemplary embodiment of the present invention.

FIG. 7 is a flowchart illustrating operation examples of the on-vehicle device and the vehicle evaluation device according to the first exemplary embodiment of the present invention. The process in FIG. 7 is specifically performed by vehicle-side controller 104 and evaluation controller 203.

Firstly, the operation of evaluation controller 203 will be described. When starting evaluation, evaluation controller 203 activates projector 204 and second projector 210 (S101), and then, transmits an evaluation start signal to on-vehicle device 10 by controlling communication unit 201 (S102). The evaluation start signal is for notifying on-vehicle device 10 of the start of evaluation of functions based on camera 102 and distance measurement sensor 101.

After S102, evaluation controller 203 reads an evaluation scenario (S103), and controls the position of projection target 207 and projection by projector 204 according to this scenario (S104). Specifically, evaluation controller 203 performs the control for changing an image to be projected on projection target 207 according to the position of projection target 207, as described with reference to FIGS. 5A to 6B. When a display of a background image is included in the scenario in S104, evaluation controller 203 controls second projector 210. Second projector 210 projects a background image onto screen 208.

If the scenario is not ended (NO in S105), evaluation controller 203 returns the process to S103 to read continued scenario (S103) and execute this scenario (S104). S103 to S105 are an evaluation environment control for controlling an environment around vehicle 1.

If the scenario read in S103 is ended (YES in S105), evaluation controller 203 stops projector 204 and second projector 210 (S106).

After S106, evaluation controller 203 transmits an evaluation end signal to on-vehicle device 10 (S107) by controlling communication unit 201, and then, ends the process (evaluation end). The evaluation end signal is for notifying on-vehicle device 10 of the end of evaluation of functions based on camera 102 and distance measurement sensor 101.

Next, the operation of vehicle-side controller 104 will be described. When receiving the evaluation start signal from vehicle evaluation device 20 through communication unit 201 (YES in S201), vehicle-side controller 104 activates camera 102 (S202) and activates distance measurement sensor 101 (S203). With S202 and S203, vehicle-side controller 104 enables the functions based on camera 102 and distance measurement sensor 101 mounted to vehicle 1.

When not receiving the evaluation start signal (NO in S201), vehicle-side controller 104 executes S201 again.

After S203, vehicle-side controller 104 accumulates various pieces of information in storage unit 105, and performs various notifications according to camera 102 and the measurement result of distance measurement sensor 101 by controlling notification unit 206 (S204).

Various pieces of information accumulated in storage unit 105 include an image captured by camera 102, the measurement result of distance measurement sensor 101, and a notification history of notification unit 206, for example. As the notification, notification unit 206 issues a warning with sound or a display on the display, when it is determined that an object such as another vehicle approaches around vehicle 1 by using at least one of the image captured by camera 102 and the measurement result of distance measurement sensor 101.

When not receiving the evaluation end signal (NO in S205), vehicle-side controller 104 again executes S204 to accumulate information and perform notification. When receiving the evaluation end signal from vehicle evaluation device 20 through communication unit 201 (YES in S205), vehicle-side controller 104 ends the accumulation and notification in S204, and returns the process to S201.

As described above, evaluation controller 203 transmits the evaluation start signal, which requests to enable the functions based on camera 102 and distance measurement sensor 101 mounted to vehicle 1, to vehicle 1, and then, starts the control for changing an image to be projected on projection target 207 according to the position of projection target 207.

[Effects of Present Exemplary Embodiment]

As described above, the vehicle evaluation device according to the first exemplary embodiment performs control for changing an image according to the position of the projection target, whereby the function based on the camera mounted to the vehicle can be evaluated on the basis of the image projected on the projection target, and the function based on the distance measurement sensor mounted to the vehicle can be evaluated by changing the position of the projection target. From the above, the vehicle evaluation device according to the first exemplary embodiment provides an effect of being capable of simultaneously evaluating the functions based on the camera and based on the distance measurement sensor.

Second Exemplary Embodiment

Figure 8A:
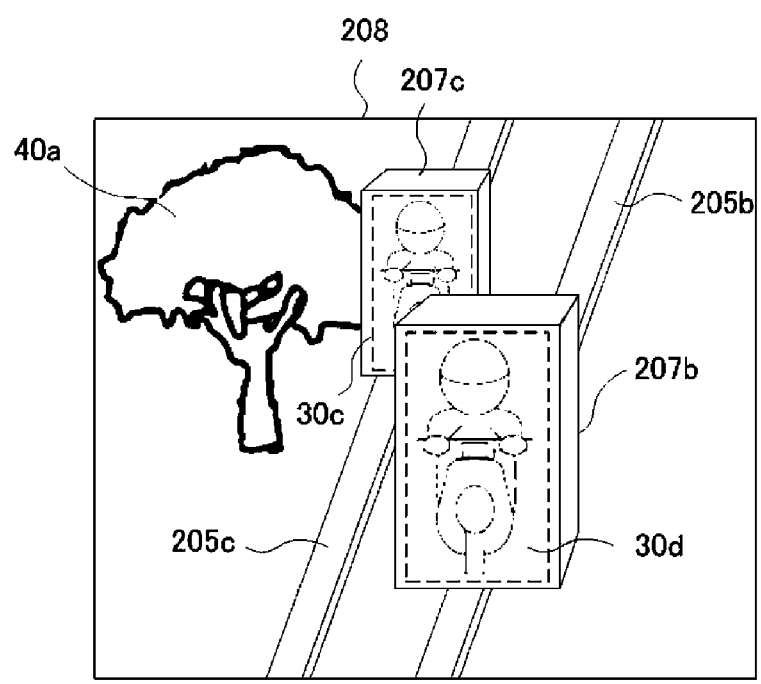
FIG. 8A is a diagram for describing an image captured by a camera according to a second exemplary embodiment of the present invention.
Figure 8B:
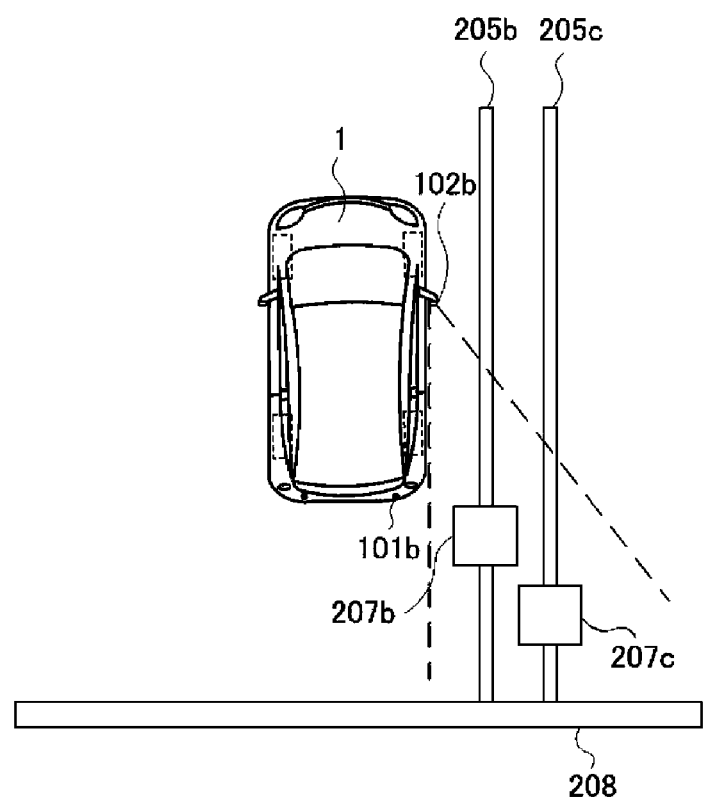
FIG. 8B is a diagram for describing an image captured by the camera according to the second exemplary embodiment of the present invention.
Figure 9:
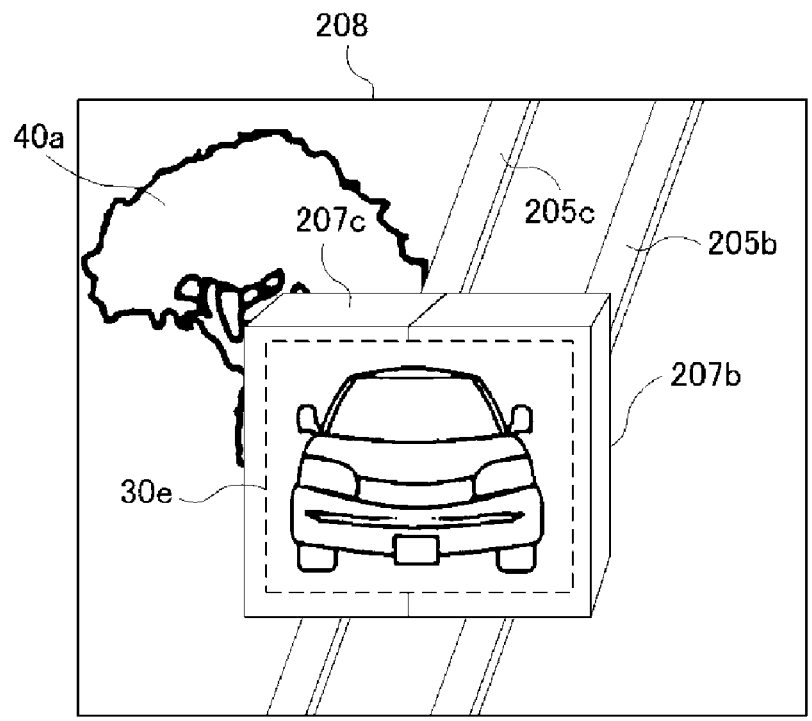
FIG. 9 is a diagram for describing an image captured by the camera according to the second exemplary embodiment of the present invention.

A second exemplary embodiment of the present invention will be described below in detail with reference to FIGS. 8A to 9. FIGS. 8A to 9 are diagrams for describing an image captured by a camera according to the second exemplary embodiment of the present invention. The components having the similar configuration to those in the first exemplary embodiment are identified by the same reference numerals, and their description will be omitted. The different point will be described in detail.

As illustrated in FIG. 8A, a projection target may include a plurality of members (projection target 207b and projection target 207c). As illustrated in FIG. 8B, projection target 207b and projection target 207c are variable in positions in the direction parallel to the direction in which vehicle 1 moves forward or backward by rails 205b and 205c which are closely adjacent to each other in parallel. Further, an image can be independently projected on projection target 207b and projection target 207c by a plurality of projectors.

As illustrated in FIG. 8A, the positions of projection target 207b and projection target 207c differ in the front-back direction of vehicle 1, and image 30c and image 30d are independently projected, whereby approach of several motorbikes to vehicle 1 can be simulated, for example.

In addition, as illustrated in FIG. 9, evaluation controller 203 controls such that the positions of projection target 207b and projection target 207c become the same in the front-back direction of vehicle 1, and projects image 30e of one vehicle on projection target 207b and projection target 207c. With this, the approach of a wide object can be simulated.

[Effects of Present Exemplary Embodiment]

As described above, with the configuration in which the projection target includes a plurality of members, and an image is projected by a plurality of projectors, a simulation of approach of several objects and a simulation of a variety of objects having different sizes are enabled.

Third Exemplary Embodiment

A third exemplary embodiment of the present invention will be described below in detail with reference to FIG. 10.

Figure 10:
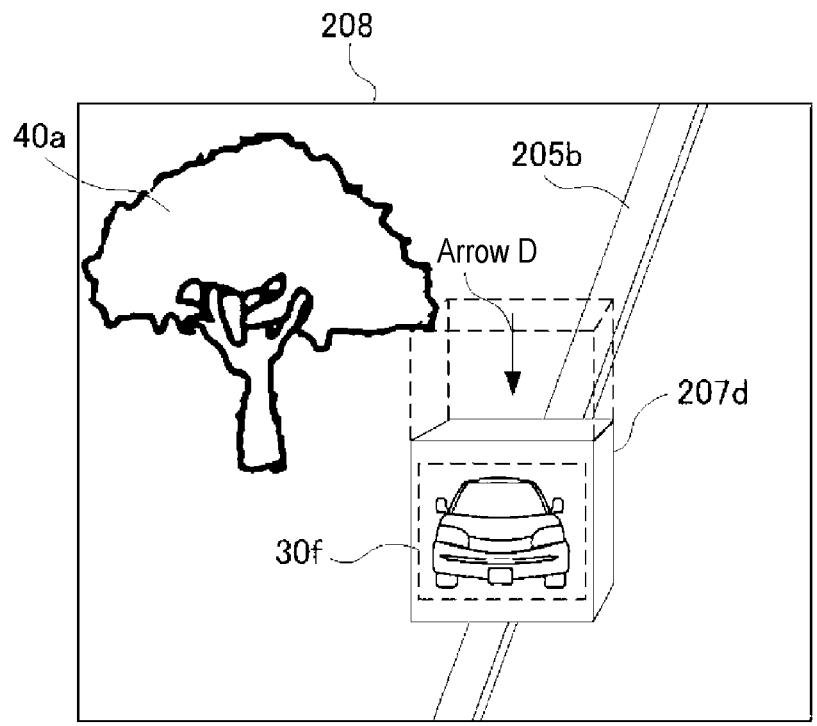
FIG. 10 is a diagram for describing an image captured by a camera according to a third exemplary embodiment of the present invention.

FIG. 10 is a diagram for describing an image captured by a camera according to the third exemplary embodiment of the present invention. The components having the similar configuration to those in the first and second exemplary embodiments are identified by the same reference numerals, and their description will be omitted. The different point will be described in detail.

Projection target 207d has an operating unit inside such as a motor, and can be extended and contracted in the vertical direction. The height of projection target 207d in the vertical direction is controlled under the control of evaluation controller 203.

Projection target 207d illustrated in FIG. 10 is lower than projection target 207b illustrated in FIG. 5A in the direction of an arrow D in FIG. 10. Image 30f which is adjusted to the height of projection target 207d is projected on projection target 207d. With this, a low object can be simulated.

[Effects of Present Exemplary Embodiment]

As described above, with the configuration in which the projection target can be extended and contracted in the vertical direction, a variety of objects having different heights can be simulated.

Fourth Exemplary Embodiment

Figure 11:
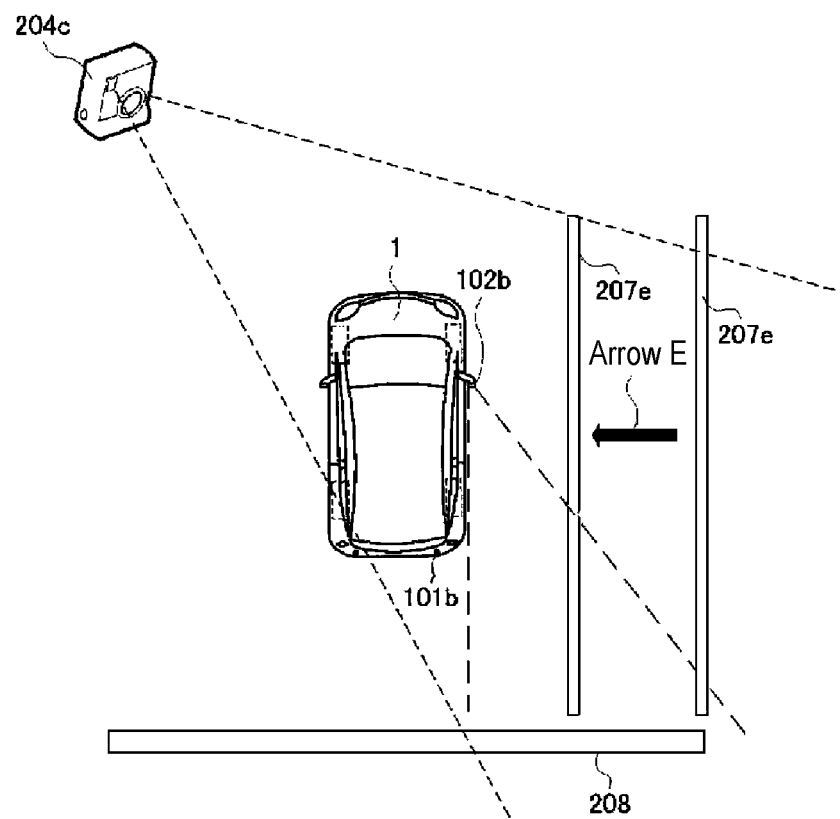
FIG. 11 is a diagram for describing a change in a position of a projection target according to a fourth exemplary embodiment of the present invention.

A fourth exemplary embodiment of the present invention will be described below in detail with reference to FIG. 11. FIG. 11 is a diagram for describing a change in a position of a projection target according to the fourth exemplary embodiment of the present invention. The components having the similar configuration to those in the first to third exemplary embodiments are identified by the same reference numerals, and their description will be omitted. The different point will be described in detail.

Projection target 207e is variable in positions in the direction parallel to the right or left direction of vehicle 1 when vehicle 1 is placed at the predetermined position. The position of projection target 207e is controlled by evaluation controller 203. Projection target 207e is a screen longer than the entire length of vehicle 1, for example. Evaluation controller 203 controls projector 204c such that an image of a guard rail adjacent to the side face of vehicle 1 is projected.

Projection target 207e is controlled to move in the direction of arrow E in FIG. 11 after the start of evaluation. With this configuration, the state in which a guard rail approaches vehicle 1 can be simulated.

[Effects of Present Exemplary Embodiment]

As described above, with the configuration in which the projection target is variable in positions in the direction parallel to the right or left direction of the vehicle, a state in which vehicle 1 approaches another object in the right-to-left direction can be simulated.

Fifth Exemplary Embodiment

A fifth exemplary embodiment of the present invention will be described below in detail with reference to FIGS. 12 to 14C. FIGS. 12 to 14C are diagrams for describing a change in a position of a projection target according to the fifth exemplary embodiment of the present invention. The components having the similar configuration to those in the first to fourth exemplary embodiments are identified by the same reference numerals, and their description will be omitted. The different point will be described in detail.

Figure 12:
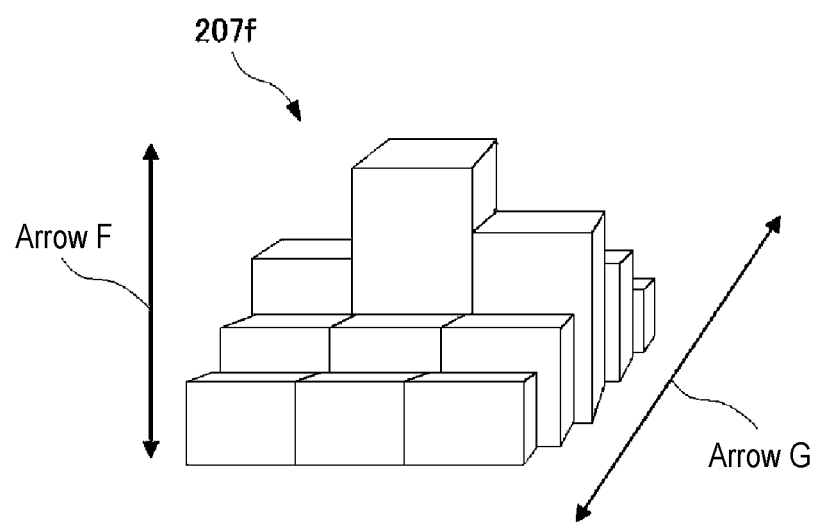
FIG. 12 is a diagram for describing a change in a position of a projection target according to a fifth exemplary embodiment of the present invention.

As illustrated in FIG. 12, projection target 207f includes a plurality of members arranged in a matrix, and the position thereof in the vertical direction with respect to a ground is variable. The position of projection target 207f in the vertical direction is controlled by evaluation controller 203. The position of each member of projection target 207f is changed in the direction parallel to arrow F in FIG. 12, but not changed in the direction parallel to the direction (arrow G) in which vehicle 1 moves forward or backward. An image can be projected on a plurality of members of projection target 207f by a plurality of projectors.

The case where projection target 207f includes projection targets 207g to 207j which are a plurality of members will be described.

Figure 13A:
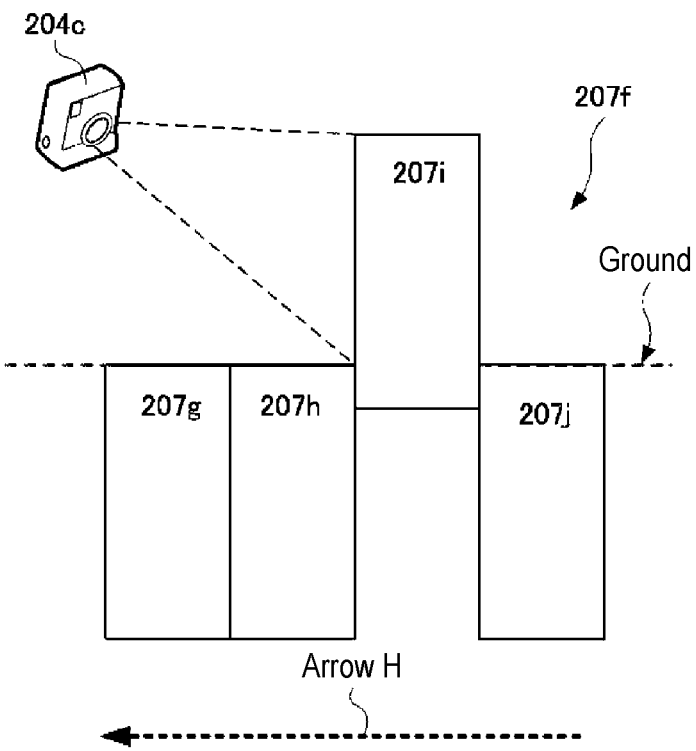
FIG. 13A is a diagram for describing a change in a position of a projection target according to the fifth exemplary embodiment of the present invention.
Figure 13B:
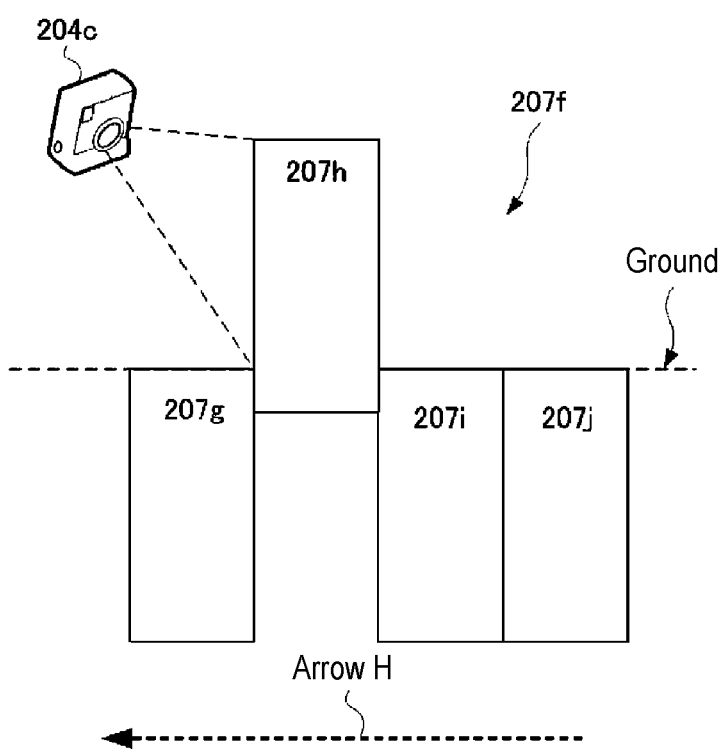
FIG. 13B is a diagram for describing a change in a position of a projection target according to the fifth exemplary embodiment of the present invention.

Arrow H illustrated in FIGS. 13A and 13B indicates the direction in which vehicle 1 moves forward. As illustrated in FIGS. 13A and 13B, projection targets 207g to 207j are controlled to sequentially protrude (to change from FIG. 13A to FIG. 13B) along the direction of arrow H. Projector 204c projects a predetermined image onto the protruding projection target. With this configuration, even when the position of the projection target is not changed in the direction parallel to the direction in which vehicle 1 moves forward or backward, approach of an object to vehicle 1 described with reference to FIGS. 5A to 6B can be simulated.

Figure 14A:
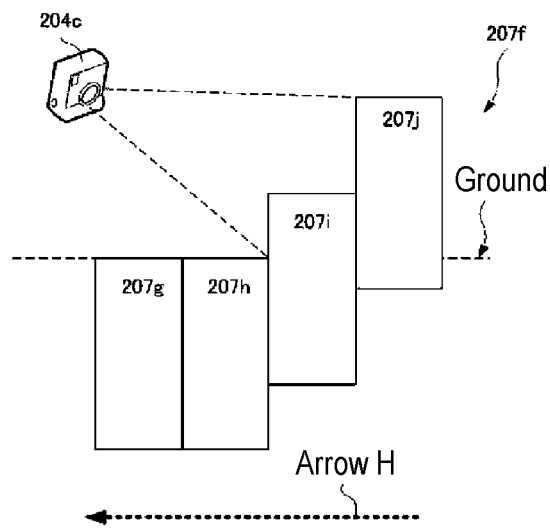
FIG. 14A is a diagram for describing a change in a position of a projection target according to the fifth exemplary embodiment of the present invention.
Figure 14B:
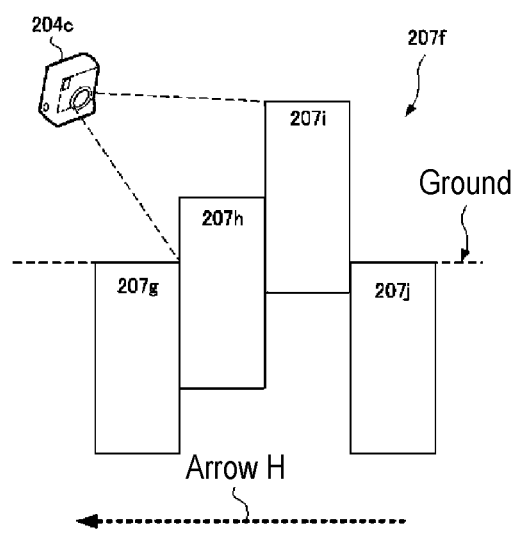
FIG. 14B is a diagram for describing a change in a position of a projection target according to the fifth exemplary embodiment of the present invention.
Figure 14C:
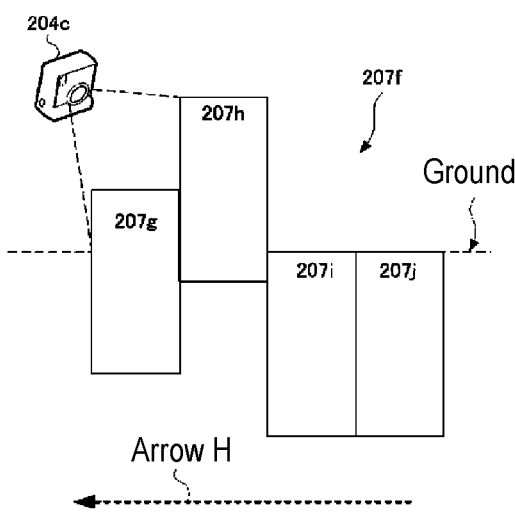
FIG. 14C is a diagram for describing a change in a position of a projection target according to the fifth exemplary embodiment of the present invention.

Further, as illustrated in FIGS. 14A to 14C, one object can be simulated by using a plurality of projection targets. As illustrated in FIG. 14A, one object is simulated by two projection targets (207i and 207j). Projector 204c projects a predetermined image on the protruding two projection targets (207i and 207j). As illustrated in FIGS. 14A to 14C, projection targets 207g to 207j are controlled such that two projection targets make one pair and the pair sequentially flexibly protrudes along the direction of arrow H (is sequentially changed in order of FIG. 14A, FIG. 14B, and FIG. 14C).

As described in S102 in FIG. 7, evaluation controller 203 transmits the evaluation start signal that notifies the start of evaluation of the functions based on camera 102 and distance measurement sensor 101 to vehicle 1. Then, evaluation controller 203 controls the height of projection target 207f in the vertical direction, and performs the evaluation environment control (S103 to S105) for changing the image to be projected on projection target 207f according to the height of projection target 207f. Thereafter, evaluation controller 203 transmits the evaluation end signal that notifies the end of evaluation of the functions based on camera 102 and distance measurement sensor 101 to vehicle 1 (S107).

Evaluation controller 203 may execute the transmission of the evaluation start signal (S102), the evaluation environment control (S103 to S105), and the transmission of the evaluation end signal (S107) as one evaluation process, and can execute different evaluation processes more than once.

Enormous items have to be executed under different evaluation environments as the evaluation of functions based on camera 102 and distance measurement sensor 101. Therefore, different evaluation processes are required to be executed more than once.

[Effects of Present Exemplary Embodiment]

As described above, with the configuration in which the projection target that is a substance is flexibly protruded, a shape of an obstacle can be simulated in various ways. Further, with the configuration in which an image is projected on the substance, the appearance of the obstacle can exactly be reproduced. Further, with the configuration in which the shape of the substance is continuously changed, the relative speed of an obstacle approaching the vehicle can be simulated. In addition, since different evaluation processes are executed more than once, evaluation of enormous items can automatically be performed with the same vehicle evaluation device.

From the above, the present invention enables verification of the function of recognizing an obstacle approaching a vehicle with high efficiency.

While the first to fifth exemplary embodiments have been described above, the description is only illustrative, and various modifications are possible without departing from the spirit of the present invention.

INDUSTRIAL APPLICABILITY

The present invention is well adaptable to a vehicle evaluation device that evaluates various functions of a vehicle.

REFERENCE MARKS IN THE DRAWINGS

1: vehicle
10: on-vehicle device
20: vehicle evaluation device
30a, 30b, 30c, 30d, 30e, 30f: image
40a: background image
101, 101a, 101b: distance measurement sensor
102, 102a, 102b: camera
103: driving condition detection unit
104: vehicle-side controller
105: storage unit
106: notification unit
107: communication unit
108a, 108b: mirror
201: communication unit
202: storage unit
203: evaluation controller (controller)
204, 204a, 204b, 204c: projector
205, 205a, 205b, 205c: rail
206: notification unit
207, 207a, 207b, 207c, 207d, 207e, 207f, 207g, 207h, 207i, 207j: projection target
208: screen
209: wheel receiving base
210: second projector
211: wheel stopper

The invention claimed is:

1. A vehicle evaluation device comprising:
a first projection target configured to move during an evaluation process of a camera and a distance measurement sensor both mounted to a vehicle;
a first projector configured to project an image on the first projection target, the image projected on the first projection target being a first image of an object around the vehicle,
wherein the camera is configured to capture images of the first image projected on the first projection target, and the distance measurement sensor is configured to measure a distance from the vehicle to the first projection target; and
a controller configured to:
control a position of the first projection target during the evaluation process,
control the first projector to change the image projected on the first projection target from the first image to a second image of an object around the vehicle based on the position of the first projection target during the evaluation process, and
transmit an evaluation start signal that notifies a start of the evaluation process to the vehicle controller and then controls the first projector to begin projecting the image on the first projection target,
wherein the first projection target is further configured to move during the evaluation process in parallel to a direction in which the vehicle installed at a predetermined position would move.

2. The vehicle evaluation device according to claim 1, wherein the first projection target is further configured to move during the evaluation process perpendicular to a direction in which the vehicle installed at a predetermined position would move.

3. The vehicle evaluation device according to claim 2, wherein the first image or the second image is of a guard rail adjacent to a side face of the vehicle.

4. The vehicle evaluation device according to claim 1, further comprising a wheel receiving base on which a wheel of the vehicle is placed and which is rotatable according to a rotation of the wheel.

5. The vehicle evaluation device according to claim 1, wherein the first projection target is extendable and contractible in a vertical direction, and the controller is configured to control the position of the first projection target by controlling a height of the first projection target in the vertical direction.

6. The vehicle evaluation device according to claim 1, wherein the first projection target is movable in a vertical direction, and the controller is configured to control the position of the first projection target by controlling the position of the first projection target in the vertical direction.

7. The vehicle evaluation device according to claim 1, wherein the first projection target includes a plurality of members.

8. The vehicle evaluation device according to claim 1, wherein the first projector includes a plurality of projectors.

9. The vehicle evaluation device according to claim 1, further comprising:
a second projection target having a fixed position; and
a second projector configured to project an image on the second projection target.

10. The vehicle evaluation device according to claim 1, further comprising a power source configured to generate power to move the first projection target in a predetermined direction, wherein the controller is configured to control the position of the first projection target by controlling the power source.

11. The vehicle evaluation device according to claim 1, wherein a projection image area of the first projector is variable, and the controller is configured to control the first projector to change the image projected on the first projection target by controlling the projection image area of the first projector such that the image is not projected beyond the projection image area of the first projection target.

12. The vehicle evaluation device according to claim 1, wherein:
the first projection target includes a plurality of members configured to move in a vertical direction,
the controller is configured to control the position of the first projection target by controlling a height of the first projection target in the vertical direction,
the controller is configured to transmit an evaluation start signal to the vehicle, and to transmit an evaluation end signal to the vehicle based on the camera and the distance measurement sensor, and
after transmitting the evaluation start signal, the controller is configured to control the first projector to change the image projected on the first projection target from the first image to the second image based on the height of the first projection target.

13. The vehicle evaluation device according to claim 12, wherein in one evaluation process the controller is configured to transmit the evaluation start signal, to monitor the images of the first and second images captured by the camera and the distances measured by the distance measurement sensor, and to transmit the evaluation end signal as one evaluation process, and wherein the vehicle controller of the evaluation device is configured to perform the evaluation processes more than once.

* * * * *